United States Patent
Kim et al.

(10) Patent No.: US 12,223,737 B2
(45) Date of Patent: Feb. 11, 2025

(54) METHOD FOR OBJECT RECOGNITION USING QUEUE-BASED MODEL SELECTION AND OPTICAL FLOW IN AUTONOMOUS DRIVING ENVIRONMENT, RECORDING MEDIUM AND DEVICE FOR PERFORMING THE METHOD

(71) Applicant: Korea University Research and Business Foundation, Seoul (KR)

(72) Inventors: Joongheon Kim, Seoul (KR); Won Joon Yun, Seoul (KR); SooHyun Park, Incheon (KR)

(73) Assignee: Korea University Research and Business Foundation, Seoul (KR)

( * ) Notice: Subject to any disclaimer, the term of this patent is extended or adjusted under 35 U.S.C. 154(b) by 558 days.

(21) Appl. No.: 17/315,554

(22) Filed: May 10, 2021

(65) Prior Publication Data
US 2022/0036100 A1  Feb. 3, 2022

(30) Foreign Application Priority Data
Jul. 29, 2020  (KR) .................. 10-2020-0094506

(51) Int. Cl.
*G06V 20/58* (2022.01)
*B60W 60/00* (2020.01)
*G06N 3/08* (2023.01)

(52) U.S. Cl.
CPC .......... *G06V 20/58* (2022.01); *B60W 60/001* (2020.02); *G06N 3/08* (2013.01); *B60W 2420/403* (2013.01); *B60W 2554/4049* (2020.02)

(58) Field of Classification Search
CPC ........ G06V 20/58; G06V 20/56; G06V 10/20; B60W 60/001; B60W 2420/403;
(Continued)

(56) References Cited

U.S. PATENT DOCUMENTS

2010/0121618 A1*  5/2010  Greenwood ........... G16H 50/50
                                                                703/2
2019/0094877 A1*  3/2019  Smith .................. B62D 15/024
(Continued)

FOREIGN PATENT DOCUMENTS

KR         10-1942808 B1       1/2019
KR      10-2019-0028242 A      3/2019
(Continued)

OTHER PUBLICATIONS

Bai, Min, et al. "Exploiting semantic information and deep matching for optical flow." Computer Vision—ECCV 2016: 14th European Conference, Amsterdam, The Netherlands, Oct. 11-14, 2016, Proceedings, Part VI 14. Springer 2016.https://link.springer.com/chapter/10.1007/978-3-319-46466-4_10 (Year: 2016).*

(Continued)

*Primary Examiner* — Wesley J Tucker
*Assistant Examiner* — Han Hoang
(74) *Attorney, Agent, or Firm* — NSIP Law

(57) ABSTRACT

An object recognition method using queue-based model selection and optical flow in an autonomous driving environment includes preprocessing data through a dense flow in a matrix form by calculating an optical flow of images captured consecutively in time by a sensor for an autonomous vehicle, generating a confidence mask by generating a vectorized confidence threshold representing a probability that there is a moving object for each cell of the preprocessed matrix, determining whether there is a moving object on the images by mapping the images captured consecutively in time to the confidence mask, and selecting an object recognition model using a tradeoff constant between object recognition accuracy and queue stability in each time unit. Accordingly, it is possible to improve the performance of object recognition in an autonomous driving environment by (Continued)

applying the optical flow to the confidence threshold of the object recognition system.

6 Claims, 12 Drawing Sheets

(58) Field of Classification Search
CPC . B60W 2554/4049; G06N 3/08; G06N 3/045; G05D 1/0246; G06T 3/4007; G06T 7/11
See application file for complete search history.

(56) References Cited

U.S. PATENT DOCUMENTS

2019/0130275 A1    5/2019  Chen et al.
2022/0189170 A1*   6/2022  Zhu .................... G06V 10/776

FOREIGN PATENT DOCUMENTS

| KR | 10-2019-0086334 A | 7/2019 |
| KR | 10-2060286 B1 | 12/2019 |
| KR | 10-2060662 B1 | 12/2019 |
| KR | 10-2020-0015301 A | 2/2020 |

OTHER PUBLICATIONS

Gong, Dong, et al. "From motion blur to motion flow: A deep learning solution for removing heterogeneous motion blur." Proceedings of the IEEE conference on computer vision and pattern recognition. 2017. https://openaccess.thecvf.com/content_cvpr_2017/html/Gong_From_Motion_Blur_CVPR_2017_paper.html (Year: 2017).*

* cited by examiner

Algorithm 1 Flow Map Post-Processing and Implementation of Confidence Mask

Input : $F_{M,N}$ // M × N dense flow matrix
Output : $c_{th}$ // $S^2 \times$ n (bbox) confidence threshold vextor
(i) Flow map post-processing :
1: for $\forall e_{i,j}$ in $F_{M,N}$ do
2:   $e_{i,j} \leftarrow e_{i,j} - \min(F_{M,N})$ ;
3: end for
4: for $\forall e_{i,j}$ in $F_{M,N}$ do
5:   $e_{i,j} \leftarrow |e_{i,j} - \mathrm{median}(F_{M,N})|$ ;
6: end for
7: for $\forall e_{i,j}$ in $F_{M,N}$ do
8:   $e_{i,j} \leftarrow \mathrm{sigmoid}(e_{i,j})$;
9: end for
10: Bicubic interpolate $F_{M,N}$ into $F_{S,S}$ ;
11: Flatten $F_{S,S}$ into vector $f_{S2}$ ;
12: Replicate $f_{S2}$ then make $f_{S2 \cdot n(bbox)}$ ;
(ii) Implementation of confidence mask :
13: $f_{S2 \cdot n(bbox)} \leftarrow \dfrac{1}{1+\exp(2 \cdot f_{S2 \cdot n(bbox)})}$ ;
14: $c_{th} \leftarrow c_{th} \cdot f_{S2 * n(bbox)}$

METHOD FOR OBJECT RECOGNITION USING QUEUE-BASED MODEL SELECTION AND OPTICAL FLOW IN AUTONOMOUS DRIVING ENVIRONMENT, RECORDING MEDIUM AND DEVICE FOR PERFORMING THE METHOD

CROSS-REFERENCE TO RELATED APPLICATIONS

This application claims priority under 35 U.S.C. § 119 to Korean Patent Application No. 10-2020-0094506, filed on Jul. 29, 2020, in the Korean Intellectual Property Office, the disclosure of which is incorporated herein by reference in its entirety.

TECHNICAL FIELD

The present disclosure relates to a method for object recognition using queue-based model selection and optical flow in an autonomous driving environment, a recording medium and a device for performing the method, and more particularly, to technology that applies optical flow to object recognition through a camera in an autonomous driving environment and optimizes a system based on queue.

BACKGROUND

An object recognition system receives and preprocesses a photo image and as a result of input to a neural network, the neural network gives back what an object is and where the object is located. The requirements of object recognition in autonomous driving are real-time data processing and high accuracy.

However, the object recognition system has a tradeoff relationship between computation time and accuracy.

Additionally, the existing CNN based object recognition does not use image continuity that features a moving image, and the existing optical flow fails to recognize an object. Additionally, when a model with high performance is continuously used, queue overflow may occur.

RELATED LITERATURES

Patent Literatures (Patent Literature 0001) KR 10-2020-0015301 A
(Patent Literature 0002) KR 10-2060286 B1
(Patent Literature 0003) KR 10-2019-0028242 A
(Patent Literature 0004) KR 10-2060662 B1

SUMMARY

In view of this circumstance, the present disclosure is directed to providing an object recognition method using queue-based model selection and optical flow in an autonomous driving environment.

The present disclosure is further directed to providing a recording medium having recorded thereon a computer program for performing the object recognition method using queue-based model selection and optical flow in an autonomous driving environment.

The present disclosure is further directed to providing a device for performing the object recognition method using queue-based model selection and optical flow in an autonomous driving environment.

To achieve the above-described object of the present disclosure, an object recognition method using queue-based model selection and optical flow in an autonomous driving environment according to an embodiment includes preprocessing data through a dense flow in a matrix form by calculating an optical flow of images captured consecutively in time by a sensor for an autonomous vehicle, generating a confidence mask by generating a vectorized confidence threshold representing a probability that there is a moving object for each cell of the preprocessed matrix, determining whether there is a moving object on the images by mapping the images captured consecutively in time to the confidence mask, and selecting an object recognition model using a tradeoff constant between object recognition accuracy and queue stability in each time unit.

In an embodiment of the present disclosure, preprocessing the data may include min-max normalizing the matrix for the dense flow representing a magnitude, removing static pixel information from the normalized matrix, downsizing the matrix through interpolation, vectorizing each element of the downsized matrix, and replicating the vectorized elements at least one time.

In an embodiment of the present disclosure, removing the static pixel information from the normalized matrix may include removing pixel information within a preset distance from a median value of the normalized matrix.

In an embodiment of the present disclosure, determining whether there is a moving object may include determining that there is no object when the confidence of each cell mapped to the confidence mask is higher than the corresponding confidence threshold, and determining that there is an object when the confidence of each cell is lower than the corresponding confidence threshold.

In an embodiment of the present disclosure, selecting the object recognition model may include selecting an optimal object recognition model using a size of a stored queue based on Lyapunov optimization.

In an embodiment of the present disclosure, selecting the object recognition model may include selecting a fastest object recognition model as the size of the queue is larger, and selecting a highest accuracy object recognition model as the size of the queue is smaller.

To achieve another object of the present disclosure, a computer-readable storage medium according to an embodiment has recorded thereon a computer program for performing the object recognition method using queue-based model selection and optical flow in an autonomous driving environment.

To achieve still another object of the present disclosure, an object recognition device using queue-based model selection and optical flow in an autonomous driving environment according to an embodiment includes a preprocessing unit to preprocess data through a dense flow in a matrix form by calculating an optical flow of images captured consecutively in time by a sensor for an autonomous vehicle, a confidence mask generation unit to generate a confidence mask by generating a vectorized confidence threshold representing a probability that there is a moving object for each cell of the preprocessed matrix, an object recognition unit to determine whether there is a moving object on the images by mapping the images captured consecutively in time to the confidence mask, and a tradeoff unit to select an object recognition model using a tradeoff constant between object recognition accuracy and queue stability in each time unit.

In an embodiment of the present disclosure, the preprocessing unit may preprocess the data by min-max normalizing the matrix for the dense flow representing a magnitude, removing static pixel information from the normalized matrix, downsizing the matrix through interpolation, vectorizing each element of the downsized matrix, and replicating the vectorized elements at least one time.

In an embodiment of the present disclosure, the object recognition unit may determine that there is no object when the confidence of each cell mapped to the confidence mask is higher than the corresponding confidence threshold, and determine that there is an object when the confidence of each cell is lower than the corresponding confidence threshold.

In an embodiment of the present disclosure, the tradeoff unit may select an optimal object recognition model using a size of a stored queue based on Lyapunov optimization.

In an embodiment of the present disclosure, the tradeoff unit may select a fastest object recognition model as the size of the queue is larger, and select a highest accuracy object recognition model as the size of the queue is smaller.

According to the object recognition method using queue-based model selection and optical flow in an autonomous driving environment, it is possible to improve the performance of object recognition in an autonomous driving environment by applying optical flow to the confidence threshold of the object recognition system using the fact that images are sequentially inputted in an autonomous driving environment.

Additionally, in some instances, optical flow is unnecessary in a driving environment, and in such a situation, the tradeoff between performance and delay is optimally controlled through queue-based model selection capable of object recognition without optical flow.

Accordingly, the present disclosure may use image continuity in the existing object recognition system by use of the optical flow, thereby maximizing the performance while maintaining the system stability in autonomous driving through queue-based optimization.

BRIEF DESCRIPTION OF THE DRAWINGS

FIG. 3 shows an example of pseudo code for implementing a confidence mask using a dense flow according to the present disclosure.

DETAILED DESCRIPTION OF EMBODIMENTS

Figure 1:
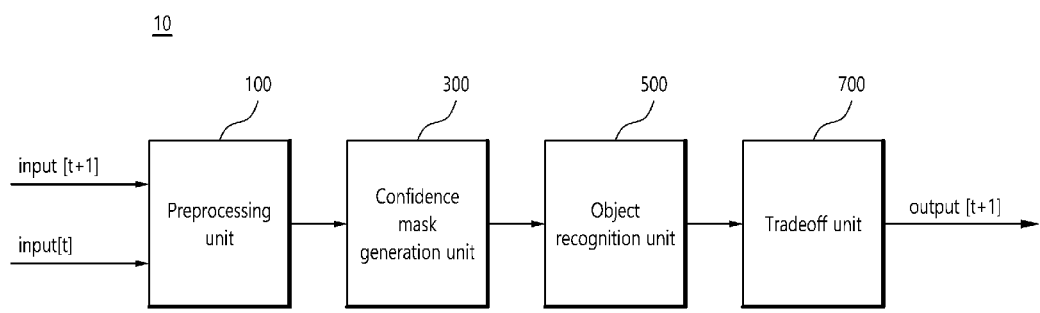
FIG. 1 is a block diagram of an object recognition device using queue-based model selection and optical flow in an autonomous driving environment according to an embodiment of the present disclosure.

The following detailed description of the present disclosure is made with reference to the accompanying drawings, in which particular embodiments for practicing the present disclosure are shown for illustration purposes. These embodiments are described in sufficiently detail for those skilled in the art to practice the present disclosure. It should be understood that various embodiments of the present disclosure are different but do not need to be mutually exclusive. For example, particular shapes, structures and features described herein in connection with one embodiment may be embodied in other embodiment without departing from the spirit and scope of the present disclosure. It should be further understood that changes may be made to the positions or placement of individual elements in each disclosed embodiment without departing from the spirit and scope of the present disclosure. Accordingly, the following detailed description is not intended to be taken in limiting senses, and the scope of the present disclosure, if appropriately described, is only defined by the appended claims along with the full scope of equivalents to which such claims are entitled. In the drawings, similar reference signs denote same or similar functions in many aspects.

Hereinafter, the preferred embodiments of the present disclosure will be described in more detail with reference to the accompanying drawings.

FIG. 1 is a block diagram of an object recognition device using queue-based model selection and optical flow in an autonomous driving environment according to an embodiment of the present disclosure.

The object recognition device 10 using queue-based model selection and optical flow in an autonomous driving environment (hereinafter the device) according to the present disclosure relates to technology that applies optical flow to the confidence threshold of an object recognition system to improve the performance, and selects a model to achieve the maximum time average performance.

In autonomous driving, photo images are sequentially received from an optical sensor, as opposed to the object recognition system. When the photos are sequentially received, the input image at the time t and the input image at the time t+1 are continuous. Thus, the optical flow may be applied, and this is a method of calculating the displacement of pixel in the image at the time t and the image at the time t+1. In a physical sense, information about moving objects or moving things is provided.

Referring to FIG. 1, the device 10 according to the present disclosure includes a preprocessing unit 100, a confidence mask generation unit 300, an object recognition unit 500 and a tradeoff unit 700.

The device 10 of the present disclosure may run software (application) for performing object recognition using queue-based model selection and optical flow in an autonomous driving environment, and the preprocessing unit 100, the confidence mask generation unit 300, the object recognition unit 500 and the tradeoff unit 700 may be controlled by the software executed by at least one processor for performing object recognition using queue-based model selection and optical flow in an autonomous driving environment, running on the device 10.

The device 10 may be a separate terminal or modules of the terminal. Additionally, the preprocessing unit 100, the confidence mask generation unit 300, the object recognition unit 500 and the tradeoff unit 700 may be formed as an integrated module or at least one module. However, to the contrary, each element may be formed as a separate module.

The device 10 may be mobile or fixed. The device 10 may be in the form of a server or an engine, and may be interchangeably used with a device, an apparatus, a terminal, user equipment (UE), a mobile station (MS), a wireless device and a handheld device.

The device 10 including at least one processor may execute or create a variety of software based on an Operation System (OS), namely, a system. The OS is a system program for enabling software to use the hardware of the device, and may include mobile computer OS including Android OS, iOS, Windows Mobile OS, Bada OS, Symbian OS and Blackberry OS and computer OS including Windows family, Linux family, Unix family, MAC, AIX and HP-UX.

The preprocessing unit 100 preprocesses data through the dense flow in a matrix form by calculating the optical flow of images captured consecutively in time by a sensor for an autonomous vehicle.

The confidence mask generation unit 300 generates a confidence mask by generating a vectorized confidence threshold representing the probability that there is a moving object for each cell of the preprocessed matrix.

Figure 2:
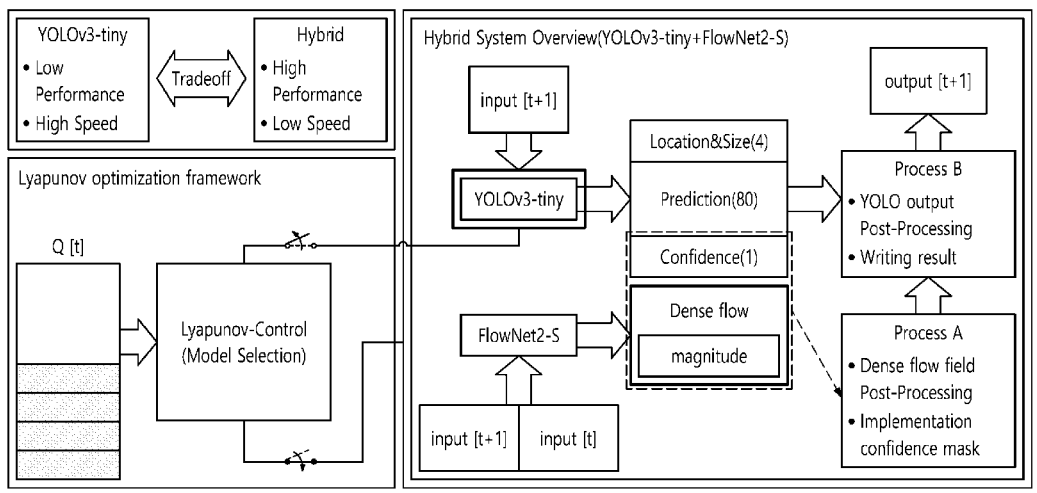
FIG. 2 is a conceptual diagram for describing an object recognition system in an autonomous driving environment according to the present disclosure.

Referring to FIG. 2, an object recognition system widely known as real-time object recognition is YOLOv3-Tiny. YOLOv3-Tiny divides a photo image into a 26×26 grid, and creates a prediction probability map representing the probability that there is an object in the corresponding cell for each cell. Additionally, each cell has confidence representing the probability that there is an object, and the collected confidence is used to determine whether an object is detected.

Meanwhile, there is a deep learning based system that calculates the optical flow in real time. FlowNet is the most common deep learning system architecture that calculates the optical flow, and in an embodiment of the present disclosure, FlowNet2-S known as the fastest one is used. FlowNet2-S receives two consecutive images as input.

The displacement of a pixel is calculated, and through this, the change returns to the dense flow as output. The dense flow includes two flows: one representing a direction and the other representing a magnitude.

In an embodiment of the present disclosure, a Hybrid model of Yolov3-tiny and FlownNet2-S in combination is used to increase the performance of the object recognition architecture, YOLOv3-tiny. The dense flow is applied to the confidence of YOLO-v3-tiny as an additional condition. The use of FlowNet2-S which calculates the optical flow guarantees real-time suitability, and accordingly a Hybrid model is devised.

Hybrid and YOLOv3-tiny show the tradeoff between computation time (delay) and object recognition performance. In the Lyapunov optimization framework, the delay may be modeled with queue, and dynamic queue may be re-modeled by the Lyapunov drift. A time average optimization framework is devised by stabilizing the drift.

Accordingly, in the present disclosure, through observation of stored queue and performance every frame, the Lyapunov optimization framework selects an object recognition deep learning network model that makes a consecutive time average optimal decision for the next time t+1.

The driving environment may be divided into a driving condition and a stop condition. The optical flow is a method of calculating the displacement of a pixel, and the performance may be improved since there is a change in a pixel in a driving environment. However, if the optical flow is used when an image is static, since there is no displacement of a pixel, computation is redundant. Additionally, in this case, there is no performance improvement.

Additionally, the number of recognized objects and the computation time have a proportional relationship. Accordingly, when many objects were recognized, the system may be inappropriate for real-time. Thus, queue and performance are observed at the time t, and a stable and high performance one of two networks is selected at the next time t+1.

The present disclosure proposes a hybrid model. An object is a set of pixels that make up a closed plane. When recognizing a motion using the optical flow, a change in size and direction of a pixel is identified using the dense flow. In a driving environment, the pixels that make up the object linearly increases/decreases in size.

The result of YOLOv3-tiny is the center of mass $(t_x, t_y)$ of the object, the relative width and height $(t_w, t_h)$, confidence c, and probabilities for 80 classes, leading to 85 columns for each cell. Additionally, a final determination is made for a 26×26 grid and 3 bounding boxes, leading to 2028 rows. The output of FlowNet2-S, the magnitude of the dense flow $\mathcal{F}_{M,N}$, is 128×96, and all the elements $e_{i,j}$ of $\mathcal{F}_{M,N}$ have real number values in the range of $(-\infty, +\infty)$. The magnitude of $\mathcal{F}_{M,N}$ is 128×96, and may be represented as the following Equation 1.

$$\mathcal{F}_{28,96} = \begin{pmatrix} e_{1,1} & e_{1,2} & \cdots & e_{1,96} \\ e_{2,1} & e_{2,2} & \cdots & e_{2,96} \\ \vdots & \vdots & \ddots & \vdots \\ e_{128,1} & e_{128,2} & \cdots & e_{128,96} \end{pmatrix} \quad \text{[Equation 1]}$$

When a video is recorded in a direction while an observer is in a static state, $\mathcal{F}_{128,96}$ can be immediately used, but in a driving situation, since the observer is moving, if the object moves at the same speed as the observer, there is a possibility that the moving object looks static. Accordingly, to avoid such a phenomenon, the following data preprocessing is performed. First, min-max normalization of the dense flow is first performed (Equation 2a).

$$\mathcal{F}_{128,96} \leftarrow \{_{128,96} - \min(\mathcal{F}_{128,96})\} \quad \text{[Equation 2a]}$$

$$\mathcal{F}_{128,96} \leftarrow |_{128,96} - \text{median}(\mathcal{F}_{128,96})| \quad \text{[Equation 2b]}$$

$\min(\mathcal{F}_{128,96})$ denotes the minimum value of $\mathcal{F}_{128,96}$, and $\mathcal{F}_{128,96} \leftarrow |\mathcal{F}_{128,96} - \text{median}(\mathcal{F}_{128,96})|$ denotes the median value of $\mathcal{F}_{128,96}$.

Subsequently, as a pixel is closer to the values $e_{max}$, $e_{min}$ at two ends of the spectrum of $\mathcal{F}_{128,96}$, there is a larger amount of dynamic pixel information, and as a pixel is closer to the median value $e_{median}$, there is static pixel information (Equation 2b). Accordingly, for all $e_{i,j}$, static pixel information is removed by the method of the following Equation 3.

$$e_{i,j} \leftarrow \frac{1}{1 + \exp(-e_{i,j})} \quad \text{[Equation 3]}$$

Since YOLOv3-tiny has a 26×26 grid, it is necessary to downsize $\mathcal{F}_{128,96}$ to $\mathcal{F}_{26,26}$. Accordingly, downsizing is performed using bicubic interpolation. $\mathcal{F}_{26,26}$ is vectorized into $f_{676}$. Since YOLO uses 3 bounding boxes, $f_{676}$ is replicated three times to $f_{2028}$.

For all the elements $e_k$ of the data preprocessed $f_{2028}$, the confidence threshold $$c_{th} \leftarrow \frac{c_{th}}{1+\exp(2\cdot e_k)}$$

may be converted into a vectorized confidence threshold $$c_{th} \leftarrow \frac{c_{th}}{1+\exp(2\cdot e_k)}$$

by the following Equation 4 as below.

$$c_{th} \leftarrow \frac{c_{th}}{1+\exp(2\cdot e_k)} \quad \text{[Equation 4]}$$

Here, exp(•) denotes a transcendental function.

FIG. 3 shows pseudo code of data preprocessing of the dense flow.

Referring to FIG. 3, time complexity is O(MN). From the first line to the fourth line, the normalization process of the dense flow $\mathcal{F}_{M,N}$ is shown. In the fifth line, $\mathcal{F}_{M,N}$ is downsized to $\mathcal{F}_{S,S}$ by bicubic interpolation. The eighth and ninth lines show conversion into the vectorized confidence threshold. This is the same as Equation 4.

Figure 4A:
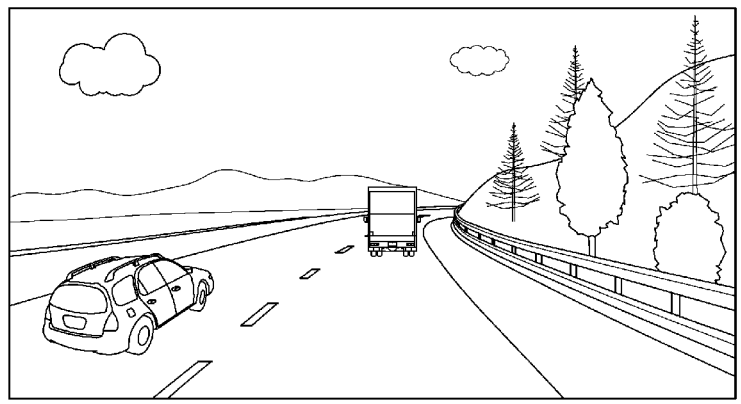
FIGS. 4A-4D is an exemplary diagram showing data preprocessing of the present disclosure.
Figure 4B:
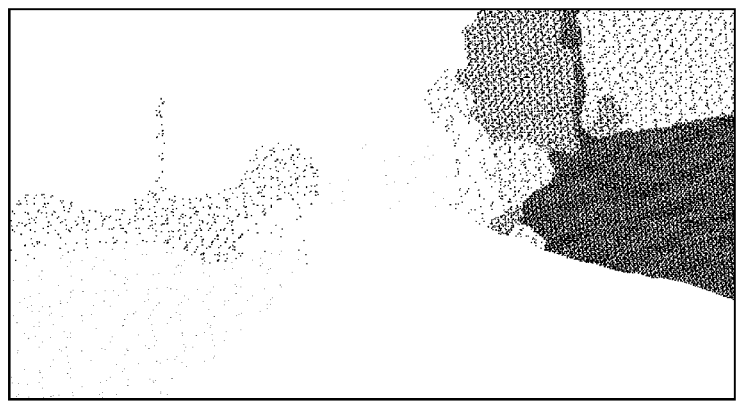
Figure 4C:
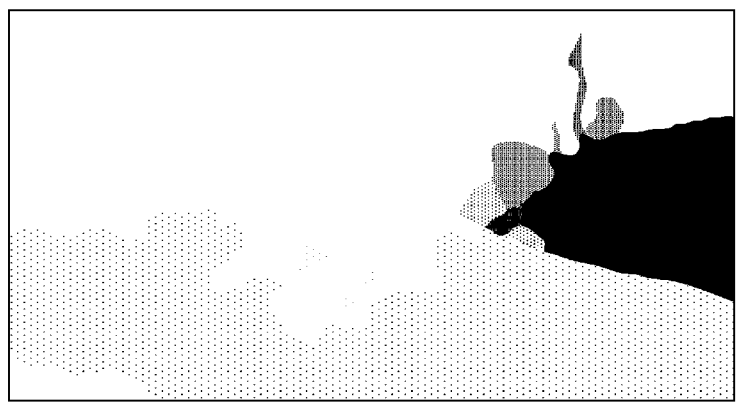
Figure 4D:
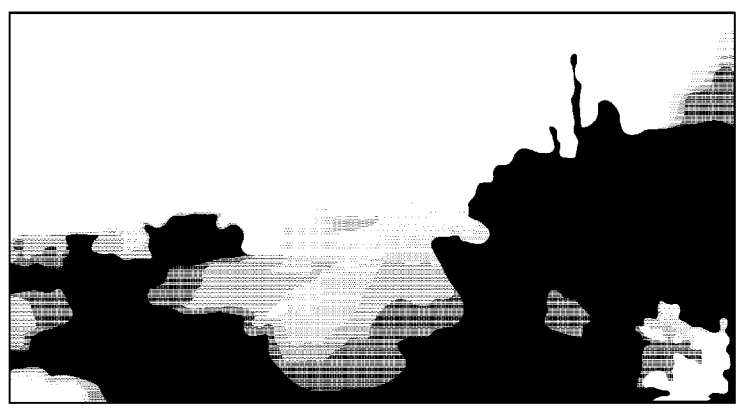

FIG. 4A shows the input image, FIG. 4B shows the optical flow estimation result according to the present disclosure, FIG. 4C shows the magnitude information of FIG. 4B, and FIG. 4D shows an example of the preprocessing result according to the present disclosure.

The object recognition unit 500 determines whether there is a moving object on the images by mapping the images captured consecutively in time to the confidence mask.

The present disclosure may build a filter for a moving object using the dense flow representing the magnitude only (see FIG. 4B). YOLOv3-tiny has the confidence threshold, and when the confidence does not exceed the confidence threshold, it is determined that there is no object, and when the confidence exceeds the threshold, it is determined that there is an object. The confidence and the confidence threshold are constant values.

When the filter is applied to the grid of YOLOv3-tiny, every image may have the confidence threshold for all cells of the grid. When the confidence is lower than the existing confidence threshold in a specific cell, it signifies that there is a high probability that there is a moving object, and when the confidence is higher than the existing confidence threshold in a specific cell, it signifies that there is a low probability that there is a moving object.

Accordingly, even though the object recognition system YOLOv3-tiny determines that there is an object as described above, when the filtered confidence is higher than the confidence threshold, it is determined that there is no object. Likewise, even though YOLOv3-tiny determines that there is no object, when the confidence is lower than the confidence threshold, it is determined that there is an object. Thereby it is possible to improve the object recognition accuracy.

The tradeoff unit 700 selects an object recognition model using a tradeoff constant between object recognition accuracy and queue stability in each time unit.

To this end, an embodiment of the present disclosure uses the Lyapunov optimization framework, and dynamic queue is modeled as in the following Equation 5.

$$Q[t+1] \triangleq \max\{Q[t]+a[t]-b(\alpha[t]),0\} \text{ where } Q[0]=0 \quad \text{[Equation 5]}$$

Here, Q[t] denotes the size of the queue stored at the time t, and a[t] denotes the arrival process of Q[t] at the time t. a[t] which is the arrival process of QV is a video streaming having random inputs. In Equation 5, b($\alpha$[t]) is a service process of Q[t] by the model selection at the time t. The mathematical program P($\alpha$[t]) for maximizing the time average object recognition accuracy is represented as the following Equation 6.

$$\max: \lim_{t\to\infty} \sum_{\tau=0}^{t-1} P(\alpha[\tau]) \quad \text{[Equation 6]}$$

Additionally, the following Equation 7 is dependent on the queue stability.

$$\lim_{t\to\infty} \frac{1}{t}\sum_{\tau=0}^{t-1} Q[\tau] < \infty \quad \text{[Equation 7]}$$

Due to this tradeoff, the drift-plus-penalty (DPP) algorithm using the Lyapunov optimization theory may maximize the time average performance while maintaining the queue stability. The Lyapunov function is defined as) $L(Q[t])=\frac{1}{2}Q[t])^2$.

Additionally, when $\Delta(\cdot)$ is a conditional quadratic Lyapunov function, the conditional quadratic Lyapunov function is written as $\mathbb{E}[L(Q[t+1])-L(Q[t]|Q[t]]$. Additionally, the dynamic policy may guarantee the queue stability while minimizing the upper bound of DPP (minimizing the negative P($\alpha$[t])), and is represented as the following Equation 8.

$$\Delta(Q[t])+V\mathbb{E}[-P(\alpha[t])] \quad \text{[Equation 8]}$$

Here, V is the tradeoff constant. The upper bounded on the drift of the Lyapunov function at the time t is derived as in the following Equation 9.

$$L(Q[t+1])-L(Q[t])=\frac{1}{2}(Q[t+1]^2-Q[t]^2)\leq\frac{1}{2}(a[t]^2+b(\alpha[t])^2)+Q[t](a[t]-b(\alpha[t])) \quad \text{[Equation 9]}$$

Accordingly, the upper bound of the conditional Lyapunov drift is derived as in the following Equation 10.

$$\Delta(Q(t))=\mathbb{E}L(Q[t+1])-L(Q[t])|Q[t])\leq C+\mathbb{E}[Q[t](a[t]-b(\alpha[t])|Q[t]] \quad \text{[Equation 10]}$$

Additionally, C is a constant given by the following Equation 11.

$$\frac{1}{2}\mathbb{E}[a[t]^2+b(\alpha[t])^2|Q[t]]\leq C \quad \text{[Equation 11]}$$

Here, C is a constant, and the arrival process a[t] is uncontrollable random images. Accordingly, a formula for minimizing the upper bound on DPP is derived as in the following Equation 11.

$$V\mathbb{E}[-P(\alpha[t])]-\mathbb{E}[Q[t]\cdot b(\alpha[t])] \quad \text{[Equation 12]}$$

The time average maximization problem of Equation 11 may be rewritten as the following Equation 12.

$$V\mathbb{E}[P(\alpha[t])]+\mathbb{E}[Q[t]\cdot b(\alpha[t])] \quad \text{[Equation 12]}$$

In Equation 12, the concept of expectation maximization is used. $V \mathbb{E}[P(\alpha[t])] + \mathbb{E}[Q[t] \cdot b(\alpha[t])]$ is determined to maximize Equation 12 based on the current Q[t]. Additionally, it is represented as the following Equation 13.

$$\alpha*[t+1] \leftarrow \arg\max_{\alpha[t] \in \mathcal{A}} [V \cdot P(\alpha[t]) + Q[t]b(\alpha[t])] \qquad \text{[Equation 13]}$$

Here, $\mathcal{A}$ is all possible object recognition models, and $\alpha*[t]$ is an optimal model selected by Equation 13 from the object recognition models. V denotes the tradeoff constant between recognition accuracy and queue stability.

Describing an example of the object recognition model selection algorithm, all variables and parameters are initialized. The algorithm works in each unit time, and observes the current accumulated queue. This is used in Equation 13. Subsequently, an equation in a closed form is calculated through computation, followed by selection, and thus the time complexity per unit time is only O(N). Accordingly, in the present disclosure, the object recognition model selection algorithm guarantees low time complexity.

To verify whether Equation 13 works correctly or not, two cases can be considered. Suppose case 1 where $Q[t] \approx \infty$, Equation 13 intends to maximize $$\alpha*[t+1] \leftarrow \arg\max_{\alpha[t] \in \mathcal{A}} [V \cdot P(\alpha[t]) + Q[t]b(\alpha[t])].$$

Accordingly, the process is performed to satisfy the queue stability, and selects the fastest one of the object recognition models.

Suppose case 2 where Q[t]=0, Equation 13 intends to maximize P(α[t]). Accordingly, the algorithm will make a selection for increased performance, and thus uses a model with high accuracy among the object recognition models.

Hereinafter, the experimental results for verifying the performance of the proposed Hybrid model will be described.

In experiment 1, (i) the required time per unit time, and (ii) the number of objects detected per unit time are used as the evaluation method. mAP is the main evaluation method in the field of object recognition, but the present disclosure cannot evaluate by mAP because of modifying the confidence threshold. Accordingly, the same video is detected for YOLOv3-Tiny (control group 1) and the proposed Hybrid (experimental group1). Experiment 1 is performed using a driving video containing the total of 385,000 images.

In experiment 2, the same video is detected for YOLOv3-Tiny (control group 1), YOLOv3 (control group 2) and the proposed Hybrid (experimental group 1) in the same way as experiment 1. Experiment 2 is performed using a driving video containing the total of 27,000 images.

In experiment 3, accuracy is determined based on (1) the total number of objects detected, (2) the number of objects detected accurately, (3) the number of objects detected inaccurately, and (4) the number of objects detected as overlapping. Experiment 3 is performed using a driving video containing the total of 2,000 images.

All the experiments are performed in an environment of python library Pytorch, OpenCV. YOLOv3-tiny uses 416× 416 image as input, and FlowNet2-S uses 384×512 image as input. The experiment is performed with the confidence threshold of 0.5 nms and the threshold of 0.2.

Figure 5:
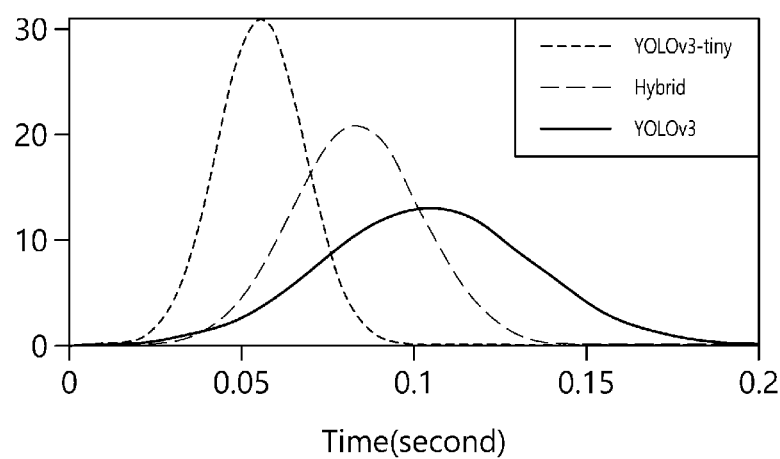
FIG. 5 shows comparative experiment results as a function of inference time showing the performance of a hybrid model according to the present disclosure.
Figure 6:
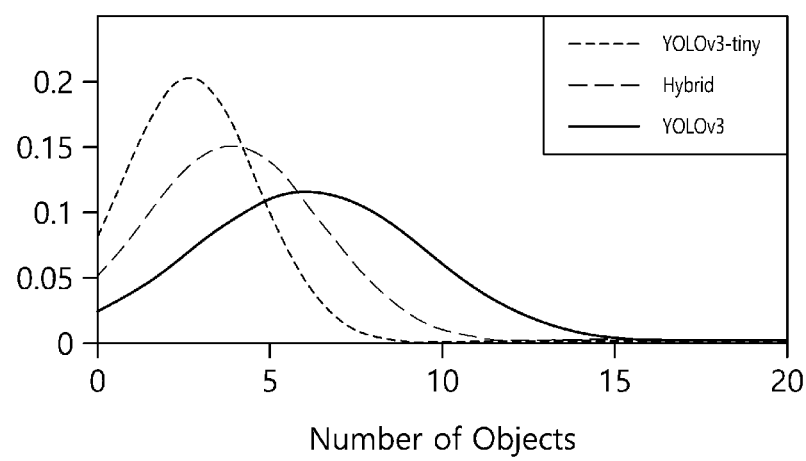
FIG. 6 shows comparative experiment results as a function of the predicted number of objects for showing the performance of a hybrid model according to the present disclosure.
Figure 7:
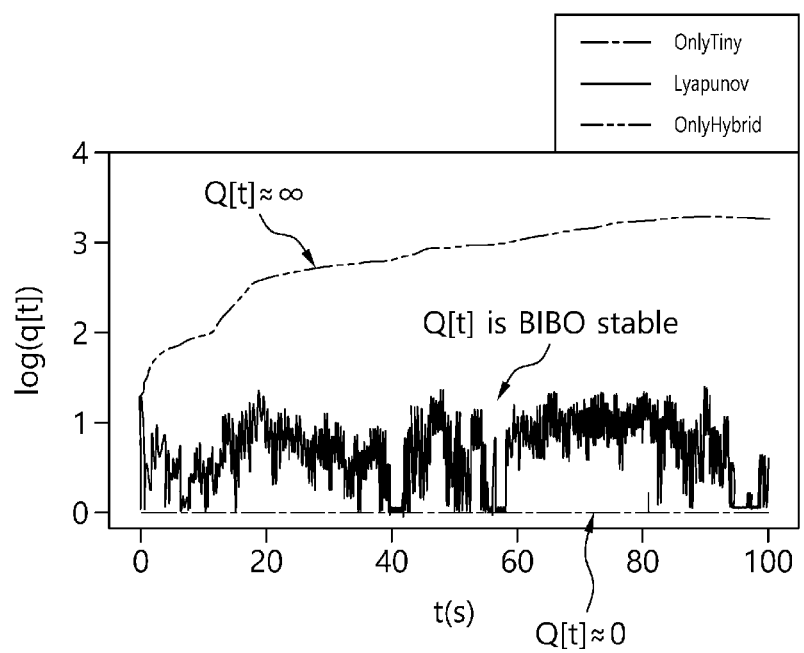
FIG. 7 shows comparative experiment results for showing the performance of a Lyapunov optimization model according to the present disclosure.

The results of experiments 1 and 2 are shown in FIGS. 5 to 7. FIG. 5 shows the inference time, FIG. 6 shows the number of objects detected, and FIG. 7 shows the queue-backlog size. Additionally, the result of experiment 3 is shown in the following Table 1.

In experiment 1, the experiment result of 385,000 images reveals that the inference time is 55 ms and 83 ms respectively for YOLOv3-Tiny and Hybrid. The total number of objects detected is 1,030,000 and 1,500,000 respectively. In terms of speed, YOLOv3-tiny is better, but in terms of accuracy, Hybrid is better.

In experiment 2, the experiment result of 27,000 images reveals that the inference time is 42 ms, 103 ms and 66 ms respectively for YOLOv3-tiny, YOLOv3 and Hybrid. The total number of objects detected is 46,300, 164,000 and 729,000 respectively, and the performance of Hybrid is found between YOLOv3-tiny and YOLOv3. However, the number of objects detected per second is highest in YOLOv3 showing 58.9/sec, and YOLOv3-tiny and Hybrid have 40.8/sec and 40.9/sec respectively.

In experiment 3, the experiment result of the total of 2,000 images reveals that the accuracy of Hybrid is higher by 3.22% than YOLOv3-tiny, and the number of objects detected accurately by Hybrid is 1.59 times larger than YOLOv3-tiny.

According to Equation 5, only the way to reduce Q[t] is to model b(α[t]). To reduce Q[t] a little bit when the model selected at the time t is Hybrid, i.e., α[t]=H and reduce Q[t] so much when the model selected at the time t is YOLOv3-tiny, i.e, α[t]=T, modeling is performed with an average fps of each model. The result of experiment 1 is modeled using b(α[t]) (as the weight as in the following Equation 14.

$$b(\alpha[t]) = \begin{cases} 2.41, & \text{if } \alpha[t] = H \\ 3.64, & \text{if } \alpha[t] = T \end{cases} \qquad \text{[Equation 14]}$$

Additionally, a[t] is random inputs that input images are unknown and thus modeling is performed at the rate of fps when a model for the basic fps of 30 frame/sec is selected.

$$a[t] = \text{time} * 30 \qquad \text{[Equation 15]}$$

Here, time refers to the time taken from input to the model to output from the model.

In Equation 13, the performance P(α[t]) is modeled with the number of detected objects using the result of experiment 2 as the weight.

$$P(\alpha[t]) = \begin{cases} num_H(\text{object}) * 1.005, & \text{if } \alpha[t] = H \\ num_T(\text{object}), & \text{if } \alpha[t] = T \end{cases}$$

$num_{(\cdot)}(\text{object})$ denotes the number of detected objects.

Specifically, under the assumption that the Q value is small, suppose the stop condition, in P(α[t]), a[t]=H or a[t]=T has almost the same value (since there is no optical flow). However, in b(α[t]), a[t]=T has a higher value, and thus model T is selected. Suppose the driving condition, in P(α[t]), a[t]=H has a higher value and thus model H is selected.

In contrast, under the assumption that Q value is infinite, suppose the stop condition, in P(α[t]), a[t]=H and a[t]=T are similar, and Q should be reduced, and thus model T is selected. Suppose the driving condition, in P(α[t]), even though a[t]=H has a higher value, Q should be reduced, and thus model T is selected.

To evaluate the performance of the present disclosure, the experiment is performed with YOLOv3-tiny (control group 3) and Hybrid (control group 4) when nothing is processed and the system (experimental group 2) that selects the model of Hybrid and YOLOv3-tiny using the accumulated queue. The results are shown in the following Table 1.

TABLE 1

| Network architecture | YOLOv3-tiny | Hybrid (inventive) |
| --- | --- | --- |
| Total number of objects | 4603 | 7562 |
| Number of objects recognized accurately | 4157 | 6646 |
| Number of objects recognized inaccurately | 312 | 259 |
| Number of overlapping objects | 144 | 667 |
| Accuracy (%) | 93.02 | 96.24 |

YOLOv3-tiny is stable too much, and when only hybrid is used, an overflow phenomenon appears. However, the maximum time average performance is observed when the model selection is performed.

Accordingly, the present disclosure uses image continuity in the existing object recognition system using the optical flow, and maximizes the performance while maintaining the system stability in autonomous driving through queue-based optimization.

Figure 8:
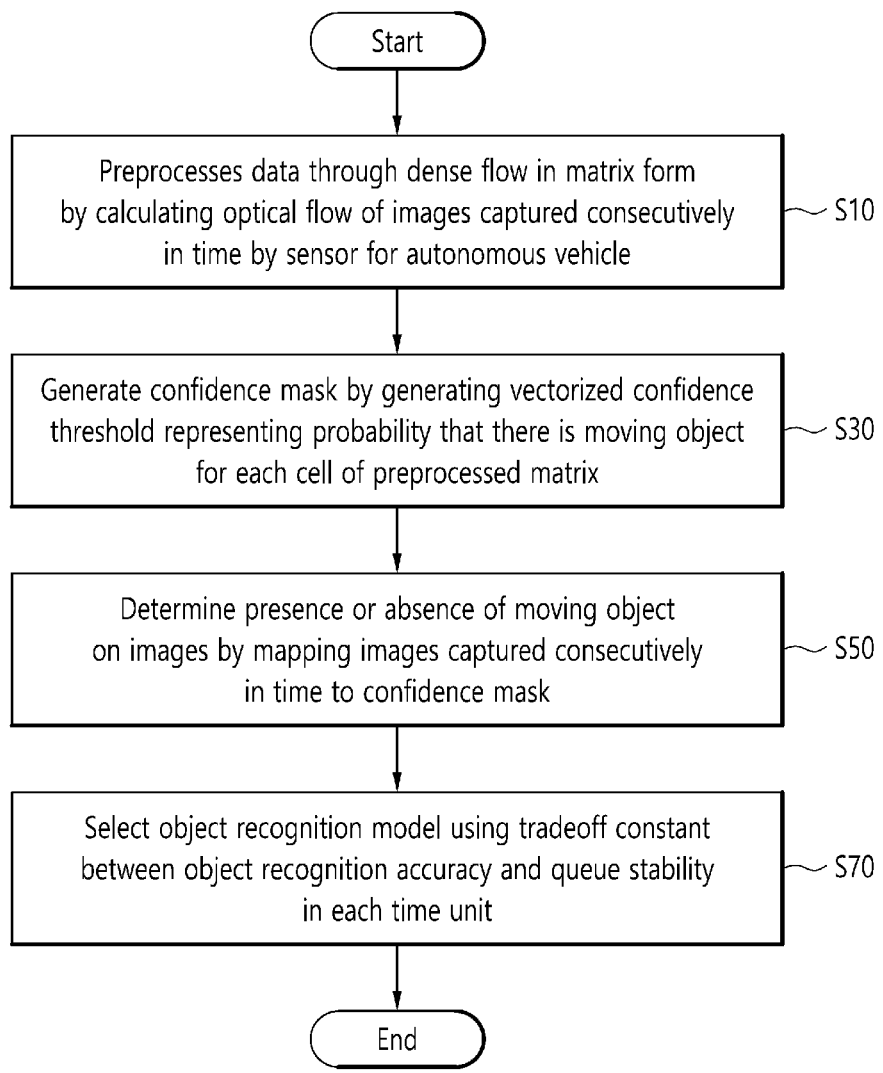
FIG. 8 is a flowchart of an object recognition method using queue-based model selection and optical flow in an autonomous driving environment according to an embodiment of the present disclosure.
Figure 9:
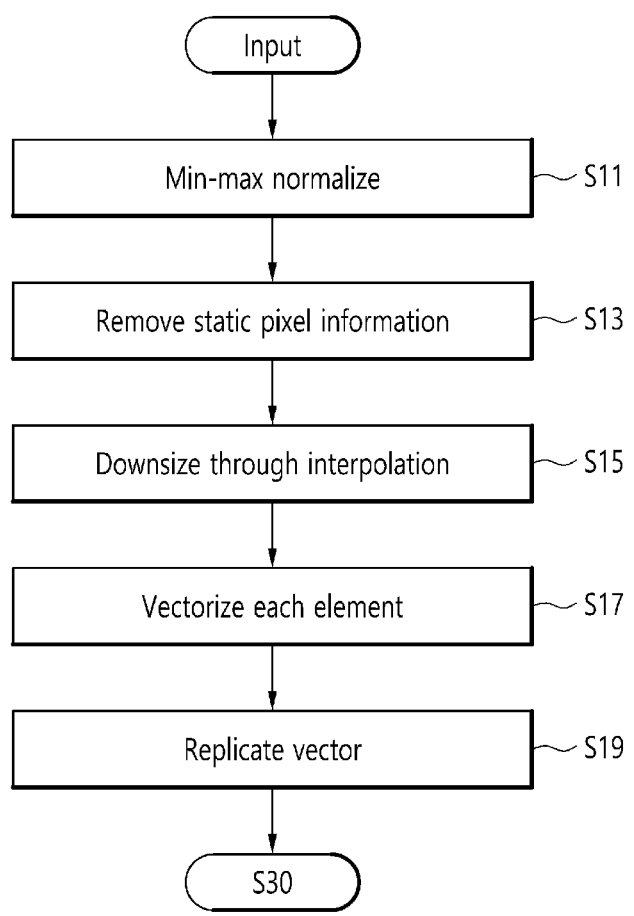
FIG. 9 is a detailed flowchart of a data preprocessing process of FIG. 8.

FIG. 8 is a flowchart of an object recognition method using queue-based model selection and optical flow in an autonomous driving environment according to an embodiment of the present disclosure. FIG. 9 is a detailed flowchart of a data preprocessing process of FIG. 8.

The object recognition method using queue-based model selection and optical flow in an autonomous driving environment according to this embodiment may be performed in substantially the same configuration as the device 10 of FIG. 1. Accordingly, the same elements as the device 10 of FIG. 1 are given the same reference signs, and a repetitive description is omitted herein.

Additionally, the object recognition method using queue-based model selection and optical flow in an autonomous driving environment according to this embodiment may be performed by the software (application) for performing object recognition using queue-based model selection and optical flow in an autonomous driving environment.

Referring to FIG. 8, the object recognition method using queue-based model selection and optical flow in an autonomous driving environment according to this embodiment preprocesses data through a dense flow in a matrix form by calculating an optical flow of images captured consecutively in time by a sensor for an autonomous vehicle (S10).

Referring to FIG. 9, in detail, the data preprocessing step includes min-max normalizing the matrix for the dense flow representing magnitude (S11), and removing static pixel information of the normalized matrix (S13). For example, static pixel information may be removed by removing pixel information within a preset distance from the median value of the normalized matrix.

The matrix is downsized through interpolation (S15), and each element of the downsized matrix is vectorized (S17). Subsequently, the vectorized elements are replicated at least one time (S19).

When the data preprocessing is completed, a confidence mask is generated by generating a vectorized confidence threshold representing the probability that there is a moving object for each cell of the preprocessed matrix (S30).

The presence or absence of a moving object on the images is determined by mapping the images captured consecutively in time to the confidence mask (S50). In an embodiment, when the confidence of each cell mapped to the confidence mask is higher than the confidence threshold, it may be determined that there is no object. In contrast, when the confidence of each cell is lower than the confidence threshold, it may be determined that there is an object.

Specifically, the image is divided into an S×S grid (i.e., a matrix), and here, each segment is referred to as a cell. For each cell, (i) there is the number of confidences corresponding to the number of bounding boxes (a constant). (ii) There are probability values for 85 classes.

For example, where S=2 and the number of bounding boxes is 3, there are 3 confidences (the number of bounding boxes) in (1, 1), (1, 2), (2, 1), (2, 2). Additionally, the system has the confidence threshold for all the cells, and it is a constant value. Only confidence above the confidence threshold becomes a candidate.

Where confidence threshold=0.8 and confidence=(0.4, 0.3, 0.1; 0.2, 0.6, 0.8; 0.4, 0.2 0.9; 0.3, 0.5, 0.8), only (0, 0, 0; 0, 0, 0.8; 0, 0, 0.9; 0, 0, 0.8) values remain in the candidate.

An object (having the highest probability value for 85 classes) is recognized by assigning classes to the cells belonging to the candidate. Here, likewise, the dense flow mask (filter) is divided into an S×S grid and the confidence threshold is mapped for each cell.

As the confidence threshold has a lower value, a higher value is given in the optical flow, and thus there is a high probability that there is a moving object. In contrast, as closer to the existing confidence threshold (=0.8), a lower value is given in the optical flow, and thus there is a low probability that there is a moving object.

For example, when the vectorized confidence threshold has (0.3, 0.3, 0.3; 0.4, 0.4 0.4; 0.5, 0.5, 0.5; 0.6, 0.6, 0.6), the candidate is as follows. Candidate: (0.4, 0.3, 0; 0, 0.6, 0.8; 0, 0, 0.9; 0, 0, 0.8), since a moving object is identified by the dense flow mask although the confidence is low, it may become a candidate.

An object recognition model is selected using a tradeoff constant between object recognition accuracy and queue stability in each time unit (S70).

In this case, an optimal object recognition model may be selected using the size of the stored queue based on Lyapunov optimization. In an embodiment, as the queue size is larger, a fastest model may be selected from the object recognition models, and as the queue size is smaller, a model with highest accuracy may be selected from the object recognition models.

According to the object recognition method using queue-based model selection and optical flow in an autonomous driving environment, it is possible to improve the performance of object recognition in an autonomous driving environment by applying the optical flow to the confidence threshold of the object recognition system using the fact that images are sequentially inputted in an autonomous driving environment.

Additionally, in some instances, optical flow is unnecessary in a driving environment, and in such a situation, the tradeoff between performance and delay is optimally controlled through queue-based model selection capable of object recognition without optical flow.

The object recognition method using queue-based model selection and optical flow in an autonomous driving environment may be implemented in the form of applications or program instructions that can be executed through a variety of computer components including at least one processor, and recorded in computer-readable recording media. The computer-readable recording media may include program instructions, data files and data structures, alone or in combination.

The program instructions recorded in the computer-readable recording media may be specially designed and configured for the present disclosure and may be known and available to persons having ordinary skill in the field of computer software.

Examples of the computer-readable recording media include hardware devices specially designed to store and execute the program instructions, for example, magnetic media such as hard disk, floppy disk and magnetic tape, optical media such as CD-ROM and DVD, magneto-optical media such as floptical disk, and ROM, RAM and flash memory.

Examples of the program instructions include machine code generated by a compiler as well as high-level language code that can be executed by a computer using an interpreter. The hardware device may be configured to act as one or more software modules to perform the processing according to the present disclosure, and vice versa.

While the present disclosure has been hereinabove described with reference to the embodiments, those skilled in the art will understand that various modifications and changes may be made thereto without departing from the spirit and scope of the present disclosure defined in the appended claims.

The present disclosure can be applied to autonomous driving but also all unmanned systems requiring vision sensors, for example, drones, robots and security cameras. As is the case with drones and robots, an environment for recognition of moving objects frequently appears, so it is possible to increase the performance by applying optical flow to object recognition. Accordingly, it can be beneficially used in a broad research area such as security cameras, object tracking robots, drones and automobiles.

DETAILED DESCRIPTION OF MAIN ELEMENTS

10: Object recognition device
100: Preprocessing unit
300: Confidence mask generation unit
500: Object recognition unit
700: Tradeoff unit

What is claimed is:

1. An object recognition method using queue-based model selection and optical flow in an autonomous driving environment, the method comprising:
preprocessing data through a dense flow in a form of a matrix by calculating an optical flow of images captured consecutively over time by a sensor for an autonomous vehicle,
wherein the preprocessing of the data comprises min-max normalizing the matrix for the dense flow representing a magnitude;
generating a confidence mask by generating a vectorized confidence threshold representing a probability that there is a moving object for each cell of the preprocessed matrix;
mapping the images captured consecutively over time to the confidence mask;
determining there is a moving object in the images when a confidence of each cell mapped to the confidence mask is lower than the corresponding confidence threshold;
determining there is no object in the images when the confidence of each cell mapped to the confidence mask is higher than the corresponding confidence threshold; and
selecting an object recognition model using a tradeoff constant between object recognition accuracy and queue stability in each time unit,
wherein the selecting of the object recognition model comprises selecting an optimal object recognition model using a size of a stored queue based on Lyapunov optimization, and
wherein the selecting of the object recognition model further comprises:
selecting a fastest object recognition model as the size of the queue is larger, and
selecting a highest accuracy object recognition model as the size of the queue is smaller.

2. The object recognition method using queue-based model selection and optical flow in an autonomous driving environment according to claim 1, wherein preprocessing the data comprises:
removing static pixel information from the normalized matrix;
downsizing the matrix through interpolation;
vectorizing each element of the downsized matrix; and
replicating the vectorized elements at least one time.

3. The object recognition method using queue-based model selection and optical flow in an autonomous driving environment according to claim 2, wherein the removing of the static pixel information from the normalized matrix comprises:
removing pixel information within a preset distance from a median value of the normalized matrix.

4. A non-transitory computer-readable storage medium having recorded thereon a computer program for performing the object recognition method using queue-based model selection and optical flow in an autonomous driving environment according to claim 1.

5. An object recognition device using queue-based model selection and optical flow in an autonomous driving environment, the object recognition device comprising at least one processor configured to run software to execute instructions, thereby configuring the processor to:
preprocess data through a dense flow in a form of a matrix by calculating an optical flow of images captured consecutively over time by a sensor for an autonomous vehicle,
wherein the at least one processor is further configured to preprocess the data by min-max normalizing the matrix for the dense flow representing a magnitude;
generate a confidence mask by generating a vectorized confidence threshold representing a probability that there is a moving object for each cell of the preprocessed matrix;
map the images captured consecutively over time to the confidence mask;
determine there is a moving object in the images when a confidence of each cell mapped to the confidence mask is lower than the corresponding confidence threshold;
determine there is no moving object in the images when the confidence of each cell mapped to the confidence mask is higher than the corresponding confidence threshold; and select an object recognition model using a tradeoff constant between object recognition accuracy and queue stability in each time unit,
wherein the at least one processor is configured to select an optimal object recognition model using a size of a stored queue based on Lyapunov optimization, and
wherein the at least one processor is further configured to:
select a fastest object recognition model as the size of the queue is larger, and
select a highest accuracy object recognition model as the size of the queue is smaller.

6. The object recognition device using queue-based model selection and optical flow in an autonomous driving environment according to claim 5,
wherein the at least one processor is configured to:
remove static pixel information from the normalized matrix,
downsize the matrix through interpolation,
vectorize each element of the downsized matrix, and
replicate the vectorized elements at least one time.

* * * * *